United States Patent
Tang et al.

(10) Patent No.: US 8,654,454 B2
(45) Date of Patent: Feb. 18, 2014

(54) THIN OPTICAL LENS ASSEMBLY

(75) Inventors: Hsiang-Chi Tang, Taichung (TW);
Chun-Shan Chen, Taichung (TW);
Hsin-Hsuan Huang, Taichung (TW)

(73) Assignee: Largan Precision Co., Taichung (TW)

( * ) Notice: Subject to any disclaimer, the term of this patent is extended or adjusted under 35 U.S.C. 154(b) by 138 days.

(21) Appl. No.: 13/150,634

(22) Filed: Jun. 1, 2011

(65) Prior Publication Data

US 2012/0127596 A1 May 24, 2012

(30) Foreign Application Priority Data

Nov. 24, 2010 (TW) ............................. 99140514 A

(51) Int. Cl.
G02B 13/18 (2006.01)
G02B 9/34 (2006.01)

(52) U.S. Cl.
USPC ............................. 359/717; 359/795; 359/793

(58) Field of Classification Search
USPC ......... 359/708, 717, 754, 793, 795, 785, 789, 359/790
See application file for complete search history.

(56) References Cited

U.S. PATENT DOCUMENTS

| | | | | |
|---|---|---|---|---|
| 6,813,100 B2 * | 11/2004 | Yamaguchi et al. | ........... | 359/793 |
| 7,038,861 B2 * | 5/2006 | Ninomiya et al. | ............ | 359/719 |
| 7,088,528 B2 | 8/2006 | Sato | | |
| 7,110,190 B2 | 9/2006 | Do et al. | | |
| 7,206,141 B2 * | 4/2007 | Zeng et al. | ..................... | 359/717 |
| 7,212,355 B2 * | 5/2007 | Wang et al | ..................... | 359/793 |
| 7,321,475 B2 * | 1/2008 | Wang et al. | ..................... | 359/793 |
| 7,372,644 B2 * | 5/2008 | Saito | ............................. | 359/794 |
| 2004/0160680 A1 | 8/2004 | Shinohara | | |
| 2005/0280904 A1 * | 12/2005 | Wang et al. | .................... | 359/717 |
| 2006/0119958 A1 * | 6/2006 | Jeong | ............................ | 359/785 |
| 2006/0221467 A1 | 10/2006 | Chen et al. | | |
| 2009/0091847 A1 * | 4/2009 | Noda | ............................. | 359/717 |

FOREIGN PATENT DOCUMENTS

| | | |
|---|---|---|
| CN | 101046544 | 10/2007 |
| EP | 1793252 B1 | 6/2007 |
| JP | 2005121685 A | 5/2005 |
| JP | 2006154517 A | 6/2006 |
| JP | 2007156031 A | 6/2007 |
| TW | I232325 | 5/2005 |
| TW | M320680 | 10/2007 |
| TW | M350713 | 5/2008 |
| TW | 201015137 | 4/2010 |

OTHER PUBLICATIONS

Warren J. Smith; "Modern Optical Engineering", Third Ed.; Lensmaker's Equation, p. 40 (see Exhibit A).

* cited by examiner

*Primary Examiner* — Alicia M Harrington
*Assistant Examiner* — Marin Pichler
(74) *Attorney, Agent, or Firm* — Wang Law Firm, Inc.; Li K. Wang; Stephen Hsu

(57) ABSTRACT

This invention discloses a thin optical lens assembly, comprising two lens elements with refractive power arranged from an object side to an image side along an optical axis, a bi-convex first lens element with a positive refractive power, a second lens element with a negative refractive power having a concave object-side surface and a convex image-side surface, and an image sensor on an image plane. Each of the two lens elements has two aspheric optical surfaces, and preferably is made of plastic. Additionally, the thin optical lens assembly satisfies the conditions of the present invention in order to reduce the total length and the sensitivity for its use in compact cameras and mobile phones with photographing functions.

7 Claims, 24 Drawing Sheets

TABLE1

(Embodiment 1)

f = 1.43 mm, Fno = 2.85, HFOV = 31.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.117 | | | | |
| 2 | Lens 1 | 2.178580 (ASP) | 0.846 | Plastic | 1.544 | 55.9 | 0.68 |
| 3 | | -0.383230 (ASP) | 0.273 | | | | |
| 4 | Lens 2 | -0.224250 (ASP) | 0.297 | Plastic | 1.634 | 23.8 | -1.07 |
| 5 | | -0.508040 (ASP) | 0.100 | | | | |
| 6 | IR-filter | Plano | 0.300 | Glass | 1.517 | 64.2 | - |
| 7 | | Plano | 0.332 | | | | |
| 8 | Image | Plano | - | | | | |

Refrence wave length of d-line is 587.6 nm, ASP denoted aspherical surface

FIG. 7

TABLE 2

Aspheric Coefficients

| Surface # | 2 | 3 | 4 | 5 |
|---|---|---|---|---|
| k = | -6.82373E+01 | -2.65527E+00 | -2.48229E+00 | -1.16687E+00 |
| A4 = | -1.06169E+00 | -1.51055E+00 | -8.13534E-02 | 4.50383E+00 |
| A6 = | 1.71867E+01 | -4.10811E-01 | 1.65310E+01 | -1.39129E+01 |
| A8 = | -2.71576E+02 | 2.80754E+01 | -2.03514E+02 | 2.82170E+01 |
| A10 = | 8.58335E+02 | -2.03517E+02 | 1.06357E+03 | -4.16990E+01 |
| A12 = | | 5.45956E+02 | -2.72338E+03 | 5.71919E+01 |
| A14 = | | -5.58082E+02 | 2.82705E+03 | -4.74103E+01 |

FIG. 8

TABLE 3

(Embodiment 2)

f = 1.13 mm, Fno = 2.83, HFOV = 35.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.030 | | | | |
| 2 | Lens 1 | 1.436810 (ASP) | 0.550 | Plastic | 1.544 | 55.9 | 0.57 |
| 3 | | -0.338510 (ASP) | 0.171 | | | | |
| 4 | Lens 2 | -0.191410 (ASP) | 0.300 | Plastic | 1.634 | 23.8 | -1.69 |
| 5 | | -0.374570 (ASP) | 0.100 | | | | |
| 6 | IR-filter | Plano | 0.200 | Glass | 1.517 | 64.2 | - |
| 7 | | Plano | 0.424 | | | | |
| 8 | Image | Plano | - | | | | |

Reference wave length of d-line is 587.6 nm, ASP denoted aspherical surface

FIG. 9

TABLE 4
Aspheric Coefficients

| Surface # | 2 | 3 | 4 | 5 |
|---|---|---|---|---|
| k = | -1.20776E+00 | -1.31583E+00 | -9.10488E-01 | -7.43572E-01 |
| A4 = | -3.18904E+00 | -1.21142E+00 | 3.58928E+00 | 1.62742E+00 |
| A6 = | 6.28578E+01 | -1.13308E+01 | 6.80176E+01 | 5.77197E+00 |
| A8 = | -1.68955E+03 | 6.03540E+01 | -5.81068E+02 | 5.51677E+01 |
| A10 = | 7.11004E+03 | -3.13996E+02 | 1.09791E+03 | -4.46480E+02 |
| A12 = | | -3.50523E+03 | 7.33835E+03 | 1.09081E+03 |
| A14 = | | 2.09746E+04 | -1.60595E+04 | -6.45708E+02 |

FIG. 10

TABLE 5

(Embodiment 3)

f = 1.42 mm, Fno = 2.85, HFOV = 31.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.123 | | | | |
| 2 | Lens 1 | 2.406190 (ASP) | 0.825 | Plastic | 1.544 | 55.9 | 0.69 |
| 3 | | -0.390080 (ASP) | 0.287 | | | | |
| 4 | Lens 2 | -0.226220 (ASP) | 0.293 | Plastic | 1.634 | 23.8 | -1.12 |
| 5 | | -0.498350 (ASP) | 0.100 | | | | |
| 6 | IR-filter | Plano | 0.300 | Glass | 1.517 | 64.2 | - |
| 7 | | Plano | 0.331 | | | | |
| 8 | Image | Plano | - | | | | |

Refrence wave length of d-line is 587.6 nm, ASP denoted aspherical surface

FIG. 11

TABLE 6
Aspheric Coefficients

| Surface # | 2 | 3 | 4 | 5 |
|---|---|---|---|---|
| k = | −2.18729E+01 | −2.27976E+00 | −2.42887E+00 | −9.67994E−01 |
| A4 = | −1.62373E+00 | −9.27407E−01 | −9.65239E−02 | 4.72700E+00 |
| A6 = | 1.90351E+01 | −5.05876E+00 | 1.76256E+01 | −1.37595E+01 |
| A8 = | −2.96347E+02 | 4.78460E+01 | −2.14768E+02 | 2.67168E+01 |
| A10 = | 9.94515E+02 | −2.45979E+02 | 1.09427E+03 | −3.87784E+01 |
| A12 = | | 5.66109E+02 | −2.61804E+03 | 6.00578E+01 |
| A14 = | | −5.15377E+02 | 2.47626E+03 | −5.39611E+01 |

FIG. 12

TABLE 7
(Embodiment 4)
f = 1.47 mm, Fno = 2.85, HFOV = 35.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.120 | | | | |
| 2 | Lens 1 | 2.748680 (ASP) | 0.837 | Plastic | 1.543 | 56.5 | 0.74 |
| 3 | | -0.422870 (ASP) | 0.347 | | | | |
| 4 | Lens 2 | -0.260800 (ASP) | 0.304 | Plastic | 1.650 | 21.4 | -1.12 |
| 5 | | -0.594060 (ASP) | 0.100 | | | | |
| 6 | IR-filter | Plano | 0.300 | Glass | 1.517 | 64.2 | - |
| 7 | | Plano | 0.280 | | | | |
| 8 | Image | Plano | - | | | | |

Refrence wave length of d-line is 587.6 nm, ASP denoted aspherical surface

FIG. 13

TABLE 8
Aspheric Coefficients

| Surface # | 2 | 3 | 4 | 5 |
|---|---|---|---|---|
| k = | 9.56519E+00 | -2.11766E+00 | -2.67682E+00 | -6.74832E-01 |
| A4 = | -2.37552E+00 | -8.08729E-01 | -7.68301E-01 | 4.15884E+00 |
| A6 = | 3.14213E+01 | -4.27467E+00 | 1.98057E+01 | -1.25393E+01 |
| A8 = | -4.08262E+02 | 3.75002E+01 | -2.23352E+02 | 2.66055E+01 |
| A10 = | 1.24671E+03 | -2.16983E+02 | 1.11169E+03 | -4.06156E+01 |
| A12 = | | 6.05331E+02 | -2.63902E+03 | 5.15838E+01 |
| A14 = | | -7.07078E+02 | 2.47098E+03 | -3.59541E+01 |

FIG. 14

TABLE 9
(Embodiment 5)

f = 1.74 mm, Fno = 2.88, HFOV = 25.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.050 | | | | |
| 2 | Lens 1 | 2.009730 (ASP) | 1.056 | Plastic | 1.583 | 30.2 | 0.75 |
| 3 | | -0.454320 (ASP) | 0.237 | | | | |
| 4 | Lens 2 | -0.363020 (ASP) | 0.250 | Plastic | 1.650 | 21.4 | -0.78 |
| 5 | | -1.620160 (ASP) | 0.100 | | | | |
| 6 | IR-filter | Plano | 0.300 | Glass | 1.517 | 64.2 | - |
| 7 | | Plano | 0.506 | | | | |
| 8 | Image | Plano | - | | | | |

Reference wave length of d-line is 587.6 nm, ASP denoted aspherical surface

FIG. 15

TABLE 10

Aspheric Coefficients

| Surface # | 2 | 3 | 4 | 5 |
|---|---|---|---|---|
| k = | -5.55120E+01 | -2.77418E+00 | -4.28346E+00 | 2.73382E+00 |
| A4 = | -2.06044E+00 | -4.38388E-01 | -5.16315E-01 | 3.26804E+00 |
| A6 = | 5.87010E+01 | -3.96886E+00 | 1.83880E+01 | -1.25458E+01 |
| A8 = | -7.06378E+02 | 3.78284E+01 | -2.13336E+02 | 2.91003E+01 |
| A10 = | 2.89711E+03 | -2.06183E+02 | 1.09529E+03 | -2.99268E+01 |
| A12 = | | 6.05331E+02 | -2.63902E+03 | 1.11394E+01 |
| A14 = | | -7.07078E+02 | 2.47098E+03 | -5.58347E+00 |

FIG. 16

TABLE 11
(Embodiment 6)
f = 1.57 mm, Fno = 2.88, HFOV = 27.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.050 | | | | |
| 2 | Lens 1 | 2.382350 (ASP) | 0.725 | Plastic | 1.583 | 30.2 | 0.74 |
| 3 | | -0.469960 (ASP) | 0.232 | | | | |
| 4 | Lens 2 | -0.384590 (ASP) | 0.250 | Plastic | 1.650 | 21.4 | -1.08 |
| 5 | | -1.073990 (ASP) | 0.100 | | | | |
| 6 | IR-filter | Plano | 0.300 | Glass | 1.517 | 64.2 | - |
| 7 | | Plano | 0.588 | | | | |
| 8 | Image | Plano | - | | | | |

Reference wave length of d-line is 587.6 nm, ASP denoted aspherical surface

FIG. 17

TABLE 12

Aspheric Coefficients

| Surface # | 2 | 3 | 4 | 5 |
|---|---|---|---|---|
| k = | -9.00000E+01 | -2.85354E+00 | -3.44866E+00 | 1.47929E+00 |
| A4 = | -3.79888E+00 | -1.37966E+00 | -9.19745E-01 | 3.04946E+00 |
| A6 = | 1.13199E+02 | -3.91503E+00 | 1.43746E+01 | -1.08997E+01 |
| A8 = | -1.73570E+03 | 3.56187E+01 | -1.88269E+02 | 3.33999E+01 |
| A10 = | 8.84484E+03 | -1.92921E+02 | 1.08792E+03 | -4.69421E+01 |
| A12 = | | 6.05331E+02 | -2.63902E+03 | -1.42394E+01 |
| A14 = | | -7.07078E+02 | 2.47098E+03 | 1.36359E+02 |

FIG. 18

THIN OPTICAL LENS ASSEMBLY

BACKGROUND OF THE INVENTION

1. Field of the Invention

The present invention relates to a thin optical lens assembly, and more particularly to a compact thin optical lens assembly applied to an electronic product.

2. Description of the Related Art

As science and technology advance, the development of electronic products such as miniaturized or thin digital still cameras, web cameras or mobile phones tends to have a compact design to meet the market demands, along with features of high resolution and high image quality.

In general, a conventional optical lens assembly of a compact electronic product comes with different designs, including the two-lens, three-lens, four-lens, and five-or-more lens designs. If the cost is taken into considerations, the two-lens design adopts a smaller number of lenses and is able to offer a lower selling price. In the lenses of a compact digital camera, web camera or mobile phone, the optical system requires a compact design, a short focal length and a good aberration adjustment. With a first lens element with a positive refractive power, a second lens element with a positive refractive power, or other combination as disclosed in U.S. patents and publications of U.S. Pat. Nos. 7,110,190, 7,088,528 and US2004/0160680, European Pat. No. EP1793252, Japanese Pat. Publication Nos. JP2007-156031 and JP2006-154517, R.O.C. Pat. Nos. TWM320680, TWM350713 and TWI232325, and P.R.C. Pat. No. CN101046544, the requirements for a compact design can be met. However, the optical systems disclosed in these patents further reduce the total length of the lens to meet the demands for a compact design. As disclosed in U.S. Pat. No. US2006/0221467, Japan Pat. Nos. JP2005121685, JP2006154517, and JP20040281830, and R.O.C. Pat. Publication No. TW201015137, a combination of positive-negative or negative-positive refractive power arrangements is adopted to reduce the length of the lens. Although these patented technologies adopting a direct way of shortening the focal length can reduce the total length of the lens effectively, it is difficult to adjust the focus, and correct or reduce the pronounced aberrations or image distortions. Therefore, the present invention provides a feasible design for shortening the total length of the optical system with a more advantageous combination of refractive power and surface curvature properties of two lens elements to reduce the total length of the optical system effectively while improving the image quality for designs applied to compact electronic products.

SUMMARY OF THE INVENTION

The primary objective of the present invention is to provide a thin optical lens assembly comprising a first lens element and a second lens element sequentially arranged from an object side to an image side along an optical axis, wherein the first lens element is a bi-convex lens element with a positive refractive power, and its object-side surface and image-side surface are aspheric; the second lens element with a negative refractive power has a concave object-side surface and a convex image-side surface, both the object-side surface and the image-side surface of the second lens element are aspheric; the thin optical lens assembly satisfies one or more of the following equations;

$$v_2 < 25 \tag{1}$$

$$N_2 < 1.75 \tag{2}$$

$$-2.0 < f/f_2 < -0.5 \tag{3}$$

$$1.2 < R_2/R_3 < 2.5 \tag{4}$$

where, $v_2$ is the Abbe number of the second lens element, $N_2$ is the refractive index of the second lens element, f is the focal length of the thin optical lens assembly, $f_2$ is the focal length of the second lens element, $R_2$ is the radius of curvature of the image-side surface of the first lens element, $R_3$ is the radius of curvature of the object-side surface of the second lens element.

On the other hand, the present invention provides a thin optical lens assembly comprising a first lens element and a second lens element sequentially arranged from an object side to an image side along an optical axis, and further comprising an aperture stop and an image sensor, wherein the first lens element and the second lens element are made of plastic materials, the first lens element is a bi-convex lens element with a positive refractive power with its object-side surface and image-side surface being aspheric, the second lens element with a negative refractive power has a concave object-side surface and a convex image-side surface with both surfaces being aspheric while at least one of the surfaces of the second lens element having at least one inflection point, and the image sensor is on an image plane. For different applications, the thin optical lens assembly satisfies the following equations:

$$0.9 < SL/TTL < 1.2 \tag{5}$$

$$0.0 < (f/f_1) + (f/f_2) < 1.2 \tag{6}$$

$$31 < v_1 - v_2 < 42 \tag{7}$$

$$-7.0 < R_1/R_2 < -3.5 \tag{8}$$

$$-3.5 < (R_3 + R_4)/(R_3 - R_4) < -2.0 \tag{9}$$

$$0.5 < T_{12}/CT_2 < 1.25 \tag{10}$$

$$0.1 < SAG_{22}/Y_{22} < 0.2 \tag{11}$$

$$1.5 < R_2/R_3 < 1.9 \tag{12}$$

$$TTL/ImgH < 2.5 \tag{13}$$

For different applications, Equation (6) is preferably:

$$0.5 < (f/f_1) + (f/f_2) < 0.9 \tag{15}$$

wherein SL is the distance from the aperture stop to the image plane on the optical axis, TTL is the distance from the object-side surface of the first lens element on the optical axis to the image plane, f is the focal length of the thin optical lens assembly, $f_1$ is the focal length of the first lens element, $f_2$ is the focal length of the second lens element, $v_1$ is the Abbe number of the first lens element, $v_2$ is the Abbe number of the second lens element, $R_1$ is the radius of curvature of the object-side surface of the first lens element, $R_2$ is the radius of curvature of the image-side surface of the first lens element, $R_3$ is the radius of curvature of the object-side surface of the second lens element; $R_4$ is the radius of curvature of the image-side surface of the second lens element, $T_{12}$ is the distance from the image-side surface of the first lens element to the object-side surface of the second lens element on the optical axis, $CT_2$ is the thickness of the second lens element on the optical axis, $Y_{22}$ is the vertical distance between a maximum-range position where the light passes through the image-side surface of the second lens element to the optical axis, $SAG_{22}$ is the distance between a position $Y_{22}$ from the optical axis on the image-side surface of the second lens element and a tangential plane through a vertex on the optical axis of the image-side surface of the second lens element, and ImgH is a half of the diagonal length of the effective photosensitive area of the image sensor.

In the present invention, the first lens element and the second lens element are installed with an appropriate interval apart on the optical axis to shorten the total length of the optical lens assembly in order to increase the field angle of an optical system and obtain a higher resolution effectively.

In the thin optical lens assembly of the present invention, the first lens element with a positive refractive power provides a portion of refractive power required by the system to reduce the total length of the thin optical lens assembly. The second lens element with a negative refractive power can correct the aberration produced by the first lens element with a positive refractive power as well as the Petzval sum of the system to make the image surface on the edge flatter, while facilitating the correction of the chromatic aberration of the system to improve the resolution of the thin optical lens assembly. The first lens element and the second lens element can reduce the back focal length of the thin optical lens assembly to facilitate the reduction of the total optical length of the optical system, so as to miniaturize the optical system.

In the thin optical lens assembly of the present invention, the first lens element is a bi-convex lens element capable of enhancing the refractive power of the first lens element effectively to shorten the total length of the thin optical lens assembly, and the object-side surface of the second lens element is a concave surface capable of extending the back focal length of the optical system effectively to assure that the effective photosensitive area of the image sensor can well receive the incident light within the thin optical lens assembly. The image sensor can be a charge coupled device (CCD) optical sensor, a complementary metal oxide semiconductor (CMOS) sensor or a light sensing film, but the image sensor is not limited to such arrangements only.

In the thin optical lens assembly of the present invention, the first lens element and the second lens element are composed of a plastic or glass material, but the lens elements are not limited to such arrangements as long as the refractive index, the Abbe number, and other material properties can satisfy the optical effect or the optical conditions of the image.

Another objective of the present invention is to provide a thin optical lens assembly comprising a first lens element and a second lens element sequentially arranged from an object side to an image side along an optical axis, along with an aperture stop and an image sensor, wherein the first lens element is a bi-convex lens element with a positive refractive power having its object-side surface and image-side surface being aspheric, and the second lens element with a negative refractive power has a concave object-side surface and a convex image-side surface with both surfaces being aspheric, and the image sensor is on an image plane. The thin optical lens assembly satisfies one or more of the following equations:

$$0.0 < (f/f_1) + (f/f_2) < 1.2 \quad (6)$$

$$31 < v_1 - v_2 < 42 \quad (7)$$

$$-7.0 < R_1/R_2 < -3.5 \quad (8)$$

$$0.5 < T_{12}/CT_2 < 1.25 \quad (10)$$

wherein $v_1$ is the Abbe number of the first lens element; $v_2$ is the Abbe number of the second lens element; $R_1$ is the radius of curvature of the object-side surface of the first lens element; $R_2$ is the radius of curvature of the image-side sur-face of the first lens element; $T_{12}$ is the distance from the image-side surface of the first lens element to the object-side surface of the second lens element on the optical axis; $CT_2$ is the thickness of the second lens element on the optical axis; f is the focal length of the thin optical lens assembly; $f_1$ is the focal length of the first lens element; and f2 is the focal length of the second lens element.

On the other hand, the present invention can be used for different applications, wherein the first lens element and the second lens element are made of plastic materials, and at least one of the object-side surface and image-side surface of the second lens element includes at least one inflection point, and one or more of the following equations are satisfied:

$$-2.0 < f/f_2 < -0.5 \quad (3)$$

$$0.9 < SL/TTL < 1.2 \quad (5)$$

$$-3.5 < (R_3+R_4)/(R_3-R4) < -2.0 \quad (9)$$

$$0.1 < SAG_{22}/Y_{22} < 0.2 \quad (11)$$

$$1.5 < R_2/R_3 < 1.9 \quad (12)$$

$$0.5 < (f/f_1) + (f/f_2) < 0.9 \quad (15)$$

wherein SL is the distance from the aperture stop to the image plane on the optical axis, TTL is the distance from the object-side surface of the first lens element on the optical axis to the image plane, f is the focal length of the thin optical lens assembly, $f_1$ is the focal length of the first lens element, $f_2$ is the focal length of the second lens element, $v_1$ is the Abbe number of the first lens element, $v_2$ is the Abbe number of the second lens element, $R_1$ is the radius of curvature of the object-side surface of the first lens element, $R_2$ is the radius of curvature of the image-side surface of the first lens element, $R_3$ is the radius of curvature of the object-side surface of the second lens element; $R_4$ is the radius of curvature of the image-side surface of the second lens element, $T_{12}$ is the distance from the image-side surface of the first lens element to the object-side surface of the second lens element on the optical axis, $CT_2$ is the thickness of the second lens element on the optical axis, $Y_{22}$ is the vertical distance between a maximum-range position where the light passes through the image-side surface of the second lens element to the optical axis, $SAG_{22}$ is the distance between a position $Y_{22}$ from the optical axis on the image-side surface of the second lens element and a tangential plane through a vertex on the optical axis of the image-side surface of the second lens element, and ImgH is a half of the diagonal length of the effective photosensitive area on the image sensor.

In the present invention, the first lens element and the second lens element are arranged in such manner to shorten the total length of the optical lens assembly and to increase the field angle of the optical system while obtaining a higher resolution.

BRIEF DESCRIPTION OF THE DRAWINGS

FIG. 7 shows Table 1 that lists optical data of the first preferred embodiment of the present invention;

FIG. 8 shows Table 2 that lists a spherical surface data of the first preferred embodiment of the present invention;

FIG. 9 shows Table 3 that lists optical data of the second preferred embodiment of the present invention;

FIG. 10 shows Table 4 that lists a spherical surface data of the second preferred embodiment of the present invention;

FIG. 11 shows Table 5 that lists optical data of the third preferred embodiment of the present invention;

FIG. 12 shows Table 6 that lists a spherical surface data of the third preferred embodiment of the present invention;

FIG. 13 shows Table 7 that lists optical data of the fourth preferred embodiment of the present invention;

FIG. 14 shows Table 8 that lists a spherical surface data of the fourth preferred embodiment of the present invention;

FIG. 15 shows Table 9 that lists optical data of the fifth preferred embodiment of the present invention;

FIG. 16 shows Table 10 that lists a spherical surface data of the fifth preferred embodiment of the present invention;

FIG. 17 shows Table 11 that lists optical data of the sixth preferred embodiment of the present invention; and FIG. 18 shows Table 12 that lists a spherical surface data of the sixth preferred embodiment of the present invention.

DETAILED DESCRIPTION OF THE PREFERRED EMBODIMENTS

Figure 1A:
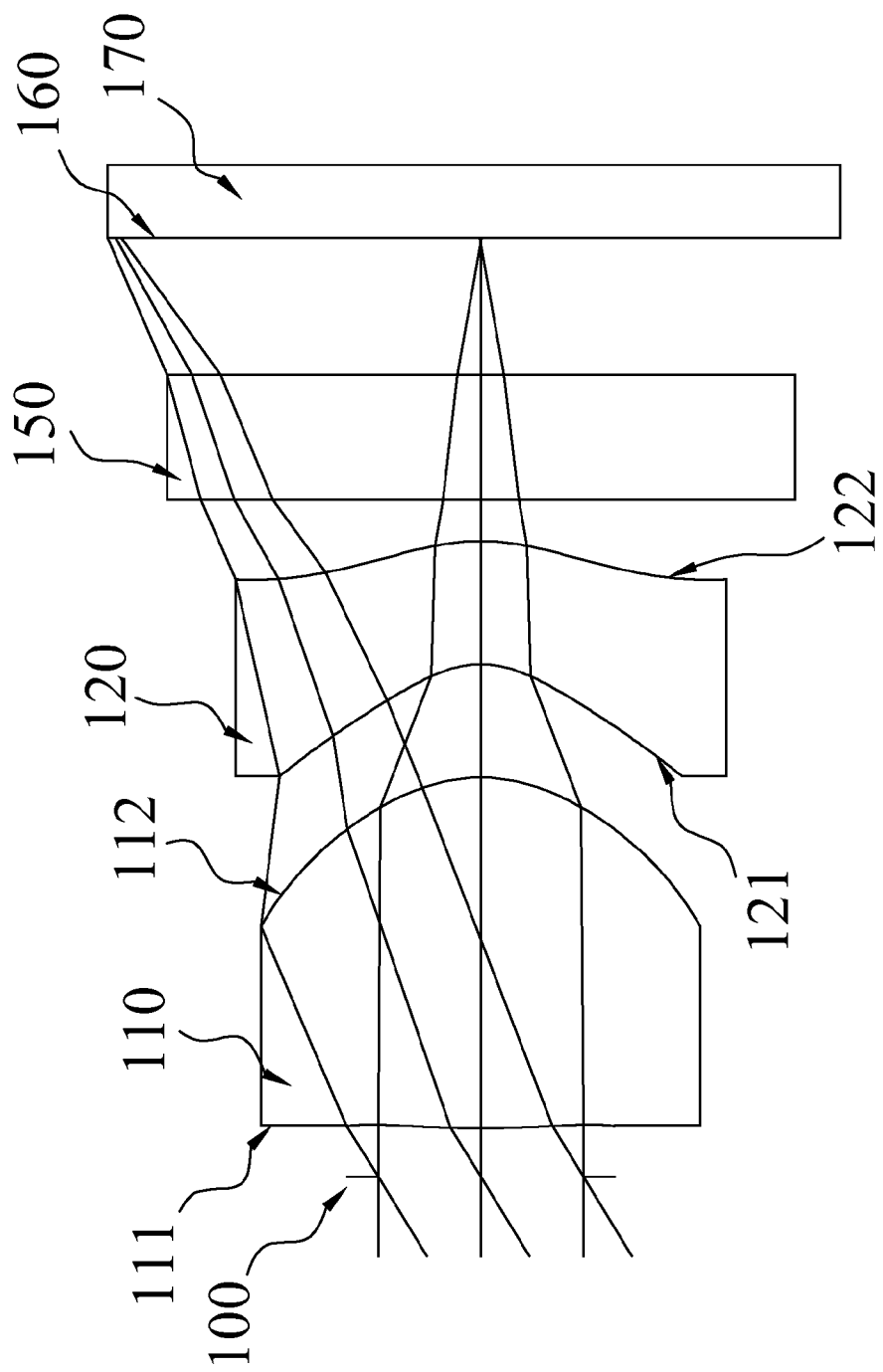
FIG. 1A is a schematic view of a lens assembly in accordance with the first preferred embodiment of the present invention.

The assembly and overall operation method of the present invention to achieve the foregoing objectives and effects will become apparent with the detailed description of preferred embodiments together with related drawings as follows:

With reference to FIG. 1A for a thin optical lens assembly of the present invention, the thin optical lens assembly comprises an aperture stop (100), a first lens element (110) with a positive refractive power, a second lens element (120) with a negative refractive power, an IR-filter (150) and an image sensor (170) sequentially arranged from an object side to an image side on an optical axis.

The first lens element (110) is a bi-convex lens element having its object-side surface (111) and image-side surface (112) being aspheric. The second lens element (120) has a concave object-side surface (121) and a convex image-side surface (122) with both surfaces thereof being aspheric. The aspherical surfaces of the first lens element (110) and the second lens element (120) satisfy the aspherical surface formula as given in Equation (14) as follows:

$$X(Y) = \frac{(Y^2/R)}{1 + \sqrt{(1-(1+K)(Y/R)^2}} + \sum_i (Ai)*(Y^i) \quad (14)$$

where X is the relative distance from a point on the aspherical surface with a distance Y from the optical axis to a tangent plane perpendicular to the optical axis on the aspherical surface;

Y is the height between a point on the curve of the aspherical surface and the optical axis;

K is the conic coefficient; and

Ai is the $i^{th}$ level aspherical surface coefficient.

The thin optical lens assembly of the present invention further comprises an aperture stop (100) and an image sensor (170), wherein the aperture stop (100) is formed between the imaged object and the first lens element (110), and the image sensor (170) is on an image plane (160), and Equations (1), (2), (3) and (4) are satisfied.

In the thin optical lens assembly of the present invention, at least one of the object-side surface (121) and image-side surface (122) of the second lens element (120) has at least one inflection point for suppressing the incident angle of the light in the off-axis field of view to further correct the aberration of the off-axis field of view. In addition, both the first lens element (110) and the second lens element (120) can be made of plastic to reduce the manufacturing cost.

In the thin optical lens assembly of the present invention, a more suitable refractive power of the second lens element (120) for correcting system aberration can be obtained if Equation (3) is satisfied. A better telecentric effect at the position of the aperture stop (100) can be achieved if Equation (5) is satisfied, and a more balanced arrangement of the refractive power of the first lens element (110) and the second lens element (120) can be obtained to reduce the system sensitivity and the aberration if Equation (6) is satisfied, and further reduction of the aberration can achieved if Equation (15) is satisfied.

In the thin optical lens assembly of the present invention, if Equation (8) is satisfied, the surface shape of the first lens element (110) will be more suitable for the manufacture of the optical lens assembly. If Equations (1) and (2) are satisfied, the aberration can be corrected.

In the thin optical lens assembly of the present invention, the correction of the chromatic aberration can be achieved if Equation (7) is satisfied, the correction of the spherical aberration can be achieved if Equation (4) is satisfied, the curvature of the second lens element (120) facilitates the correction of the system astigmatism and the high-order aberration if Equation (9) is satisfied, the thickness of the second lens element (120) and the interval between lens elements are more appropriate for reducing the overall system volume and improving the image quality to achieve an optimal balance if Equation (10) is satisfied.

As to the surface of the second lens element (120) of the thin optical lens assembly, if Equation (11) is satisfied, the shape of the second lens element (120) will not be too curvy, which not only simplifies the manufacturing of the lens, but also reduces the space required for placing each lens element in the thin optical lens assembly, so that the present lens assembly can be more compact. Furthermore, if Equation (13) is satisfied, the total length of the lens assembly can be reduced effectively.

The present invention further provides a thin optical lens assembly comprising an aperture stop (100), a first lens element (110) with a positive refractive power, a second lens element (120) with a negative refractive power, an IR-filter (150), and an image sensor (170) sequentially arranged from an object side to an image side along an optical axis. The first lens element (110) is a bi-convex lens element having both the object-side surface (111) and image-side surface (112) of the first lens element (110) being aspheric, the second lens element has a concave object-side surface (121) and a convex image-side surface (122) with both surfaces thereof being aspheric, the aperture stop (100) and image sensor (170) are provided for imaging an object, and the aperture stop (100) is placed between the imaged object and the first lens element (110), the image sensor (170) is on the image plane (160), and Equations (6), (7), (8) and (10) are satisfied. In different practices of the present invention, one or more of Equations (3), (5), (9), (11), (12) and (15) are satisfied.

The thin optical lens assembly of the present invention is described by means of preferred embodiments with relevant drawings as follows.

<First Preferred Embodiment>

Figure 1B:
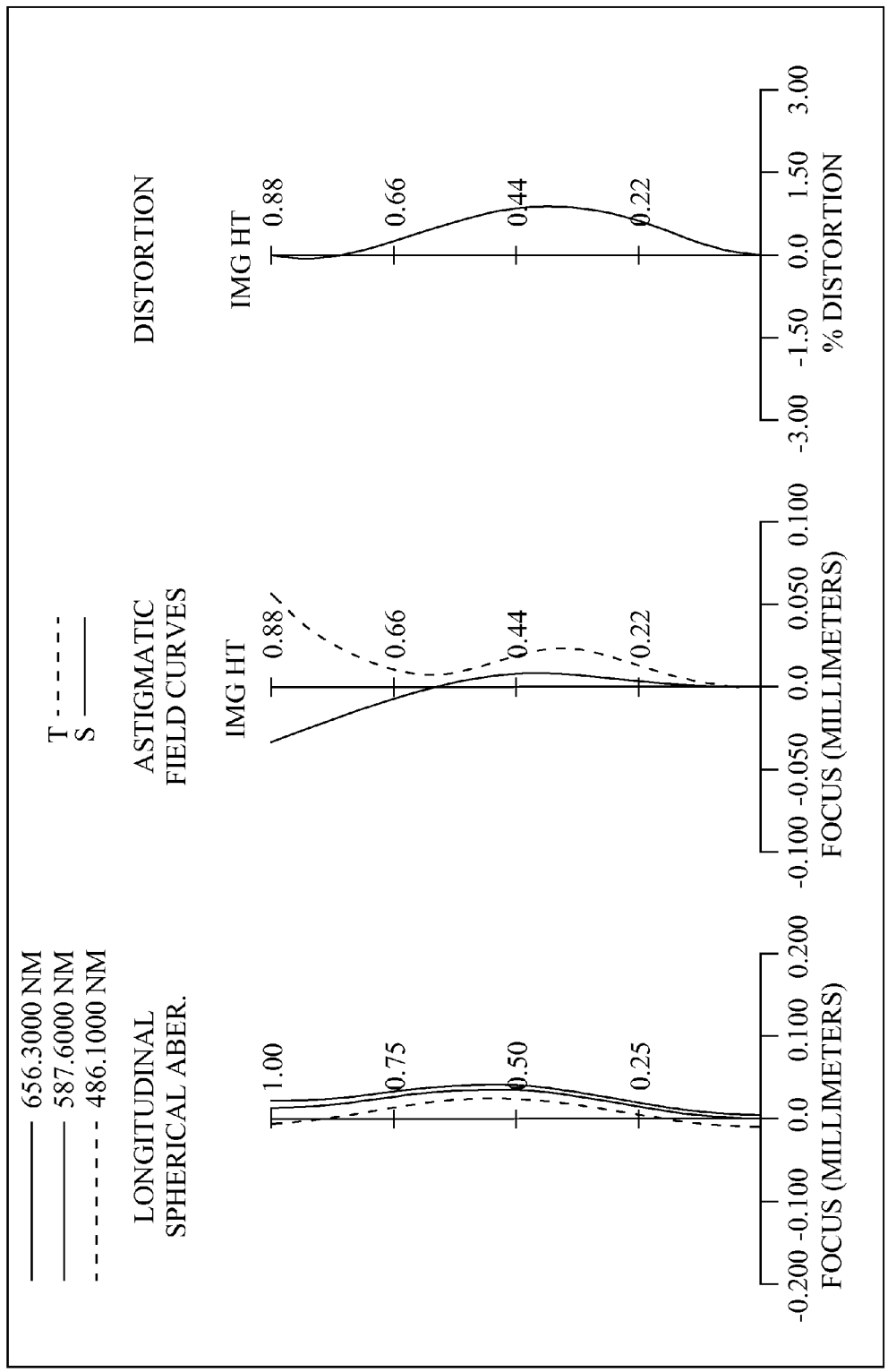
FIG. 1B is an aberration curve of the first preferred embodiment of the present invention.

With reference to FIGS. 1A and 1B for a schematic view and an aberration curve of a thin optical lens assembly in accordance with a first preferred embodiment of the present invention respectively, the thin optical lens assembly of this preferred embodiment comprises, from an object side to an image side, a first lens element (110) with a positive refractive power having a convex object-side surface (111) and a convex image-side surface (112) wherein it is made of plastic with both of its surfaces being aspheric; a second lens element (120) with a negative refractive power having a concave object-side surface (121) and a convex image-side surface (122) wherein it is made of plastic with both of its surfaces being aspheric and the image-side surface (122) of the second lens element (120) includes at least one inflection point. The surfaces of the first lens element (110) and the second lens element (120) are formed according to the aspherical surface formula as shown in Equation (14), and the aspheric surface coefficient is shown in FIG. 8 (as Table 2).

In addition, the thin optical lens assembly further comprises an aperture stop (100) formed between the first lens element (110) and the imaged object, an image sensor (170) on an image plane (160), and an IR-filter (150) installed between the second lens element (120) and image plane (160). The IR-filter (150) is made of glass and does not affect the focal length of the thin optical lens assembly of the present invention. Optical data of this preferred embodiment is shown in FIG. 7 (as Table 1) and is the basis of the calculated values for the conditional equations of this preferred embodiment in the following paragraphs.

In this preferred embodiment of the thin optical lens assembly, the thin optical lens assembly has a focal length f, an f-number value Fno, a half of the maximum view angle HFOV, and the following conditions are satisfied:

$f=1.43 \text{(mm)}$ $Fno=2.85$ $HFOV=31.5 \text{(degrees)}$.

In this preferred embodiment of the thin optical lens assembly, the second lens element (120) has a refractive index $N_2$, and the following condition is satisfied:

$N_2=1.634$.

In this preferred embodiment of the thin optical lens assembly, the first lens element (110) has an Abbe number $v_1$, the second lens element (120) has an Abbe number $v_2$, and the following conditions are satisfied:

$v_2=23.8$, $v_1-v_2=32.1$.

In this preferred embodiment of the thin optical lens assembly, the thickness from the image-side surface (112) of the first lens element (110) to the object-side surface (121) of the second lens element (120) on the optical axis is $T_{12}$, and the thickness of the second lens element (120) on the optical axis is $CT_2$, and the following condition is satisfied:

$T_{12}/CT_2=0.92$.

In this preferred embodiment of the thin optical lens assembly, the radius of curvature of the object-side surface (111) of the first lens element (110) is $R_1$, the radius of curvature of the image-side surface (112) of the first lens element (110) is $R_2$, the radius of curvature of the object-side surface (121) of the second lens element (120) is $R_3$, the radius of curvature of the image-side surface (122) of the second lens element (120) is $R_4$, and the following conditions are satisfied:

$R_1/R_2=-5.68$, $R_2/R_3=1.71$, $(R_3+R_4)/(R_3-R_4)=-2.58$.

In this preferred embodiment of the thin optical lens assembly, the first lens element (110) has a focal length $f_1$, and the second lens element (120) has a focal length $f_2$, and the following conditions are satisfied:

$f/f_2=-1.34$, $(f/f_1)+(f/f_2)=0.77$.

In this preferred embodiment of the thin optical lens assembly, the vertical distance between a maximum-range position where the light passes through the image-side surface (122) of the second lens element (120) to the optical axis is $Y_{22}$, the distance between a position Y22 from the optical axis on the image-side surface (122) of the second lens element (120) and a tangential plane through a vertex on the optical axis of the image-side surface (122) of the second lens element (120) is $SAG_{22}$, and the following condition is satisfied:

$SAG_{22}/Y_{22}=0.16$.

In this preferred embodiment of the thin optical lens assembly, the image-side surface (122) of the second lens element (120) includes an inflection point; the distance from the aperture stop (100) to the image plane (160) on the optical axis is SL, and the distance from the object-side surface (111) of the first lens element (110) to the image plane (160) on the optical axis is TTL, and the following condition is satisfied:

$SL/TTL=1.06$.

In this preferred embodiment of the thin optical lens assembly, the distance from the object-side surface (111) of the first lens element (110) to the image plane (160) on the optical axis is TTL, and half of the diagonal length of the effective photosensitive area of the image sensor (170) is ImgH, and the following condition is satisfied:

$TTL/ImgH=2.33$.

According to the optical data as shown in FIG. 7 (as Table 1) and the aberration curve as shown in FIG. 1B, the thin optical lens assembly of this preferred embodiment of the present invention provides good correction results in aspects of the longitudinal spherical aberration, astigmatic field curving, and distortion while achieving the total length reduction of the thin optical lens assembly.

<Second Preferred Embodiment>

Figure 2A:
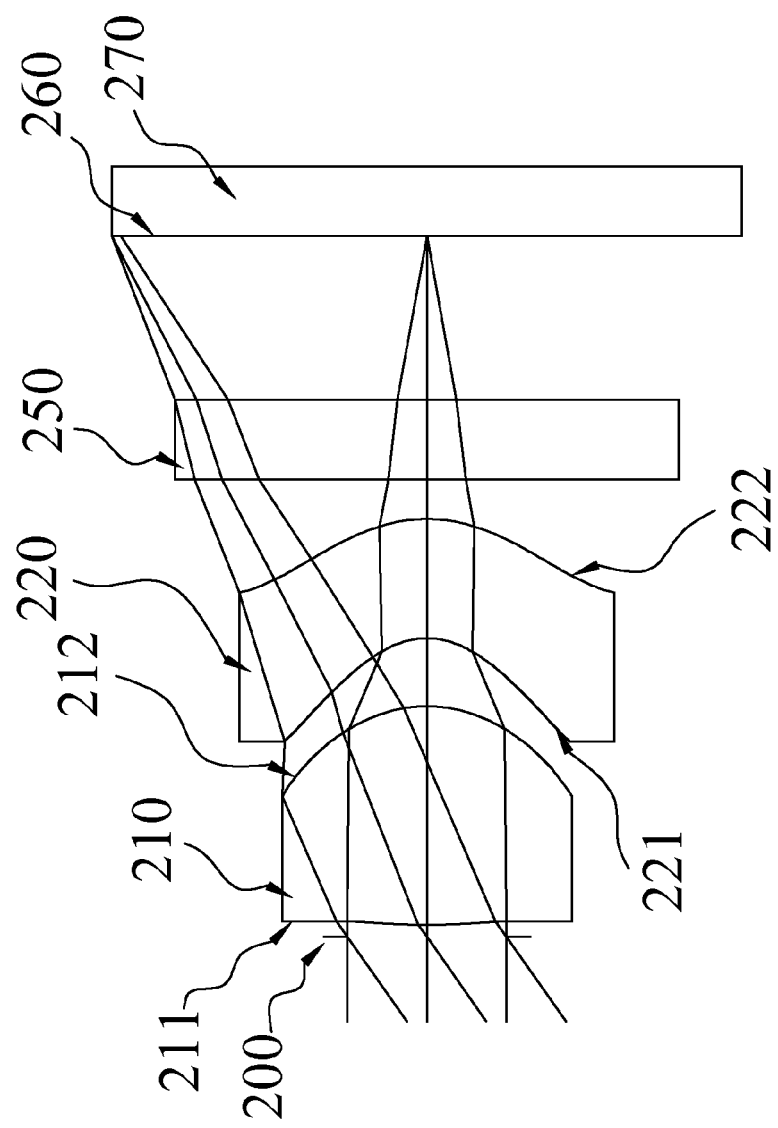
FIG. 2A is a schematic view of a lens assembly in accordance with the second preferred embodiment of the present invention.
Figure 2B:
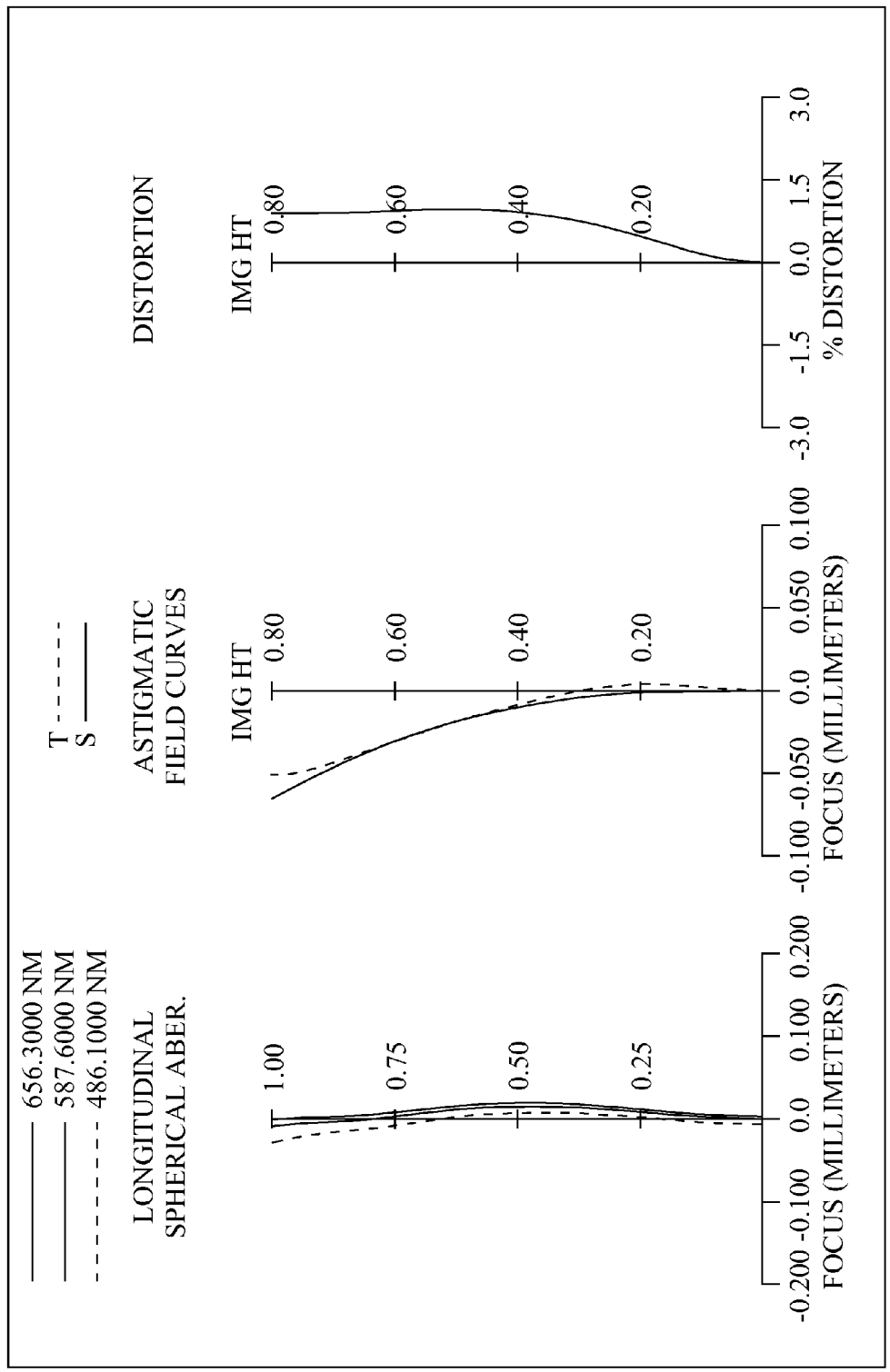
FIG. 2B is an aberration curve of the second preferred embodiment of the present invention.

With reference to FIGS. 2A and 2B for a schematic view and an aberration curve of a thin optical lens assembly in accordance with a second preferred embodiment of the present invention respectively, the thin optical lens assembly of this preferred embodiment comprises, from an object side to an image side, a first lens element (210) with a positive refractive power having a convex object-side surface (211) and a convex image-side surface (212) wherein it is made of plastic with both of its surfaces being aspheric; and a second lens element (220) with a negative refractive power having a concave object-side surface (221) and a convex image-side surface (222) wherein it is made of plastic with both of its surfaces being aspheric and the image-side surface (222) of the second lens element (220) includes at least one inflection point. The surfaces of the first lens element (210) and the second lens element (220) are formed according to the aspherical surface formula as shown in Equation (14), and the aspherical surface coefficient is shown in FIG. 10 (as Table 4).

In addition, the thin optical lens assembly further comprises an aperture stop (200) formed between the first lens element (210) and the imaged object, an image sensor (270) on an image plane (260), an IR-filter (250) installed between the second lens element (220) and image plane (260). The IR-filter (250) is made of glass and does not affect the focal length of the thin optical lens assembly of the present invention. Optical data of this preferred embodiment is shown in FIG. 9 (as Table 3) and is the basis of the calculated values for the conditional equations of this preferred embodiment.

In this preferred embodiment of the thin optical lens assembly, the thin optical lens assembly has a focal length f, an f-number value Fno, a half of the maximum view angle HFOV, and the following conditions are satisfied:

$f=1.13$(mm)

Fno=2.83

$HFOV=35.1$(degrees).

In this preferred embodiment of the thin optical lens assembly, the definitions of all variables for conditions provided in the claims ($N_2$, $v_1$, $v_2$, $T_{12}$, $CT_2$, $R_1$, $R_2$, $R_3$, $R_4$, $f_1$, $f_2$, $SAG_{22}$, $Y_{22}$, SL, TTL, and ImgH) are the same as those stated in the first embodiment with corresponding values for the second embodiment, and the following conditions are satisfied:

| | |
|---|---|
| $N_2 = 1.634$; | $(R_3 + R_4)/(R_3 - R_4) = -3.09$; |
| $v_2 = 23.8$; | $f/f_2 = -0.67$; |
| $v_1 - v_2 = 32.1$ | $(f/f_1) + (f/f_2) = 1.31$; |
| $T_{12}/CT_2 = 0.57$; | $SAG_{22}/Y_{22} = 0.39$; |
| $R_1/R_2 = -4.24$; | $SL/TTL = 1.02$ ; |
| $R_2/R_3 = 1.77$; | $TTL/ImgH = 2.10$. |

According to the optical data as shown in FIG. 9 (as Table 3) and the aberration curve as shown in FIG. 2B, the thin optical lens assembly of this preferred embodiment of the present invention provides good correction results in aspects of the longitudinal spherical aberration, astigmatic field curving, and distortion while achieving the total length reduction of the thin optical lens assembly.

<Third Preferred Embodiment>

Figure 3A:
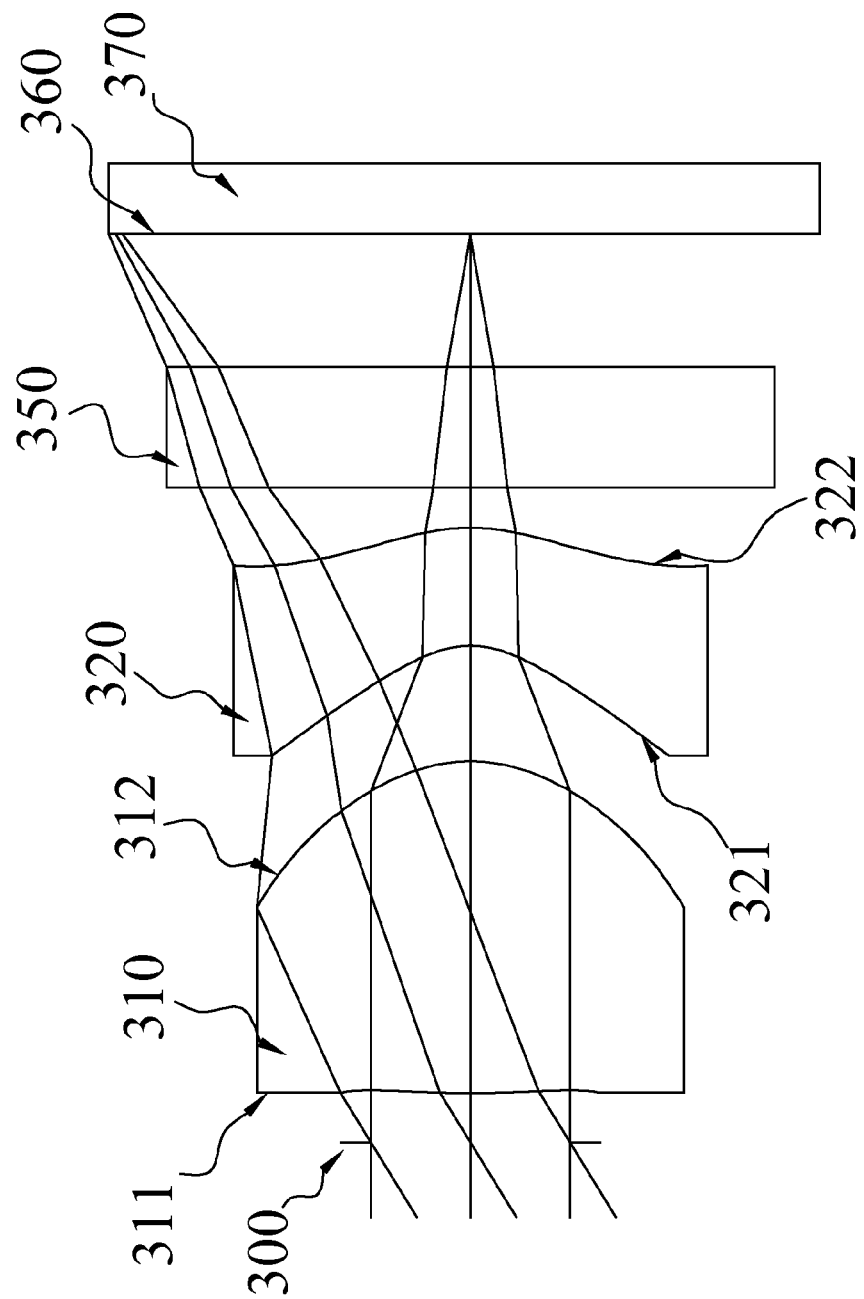
FIG. 3A is a schematic view of a lens assembly in accordance with the third preferred embodiment of the present invention.
Figure 3B:
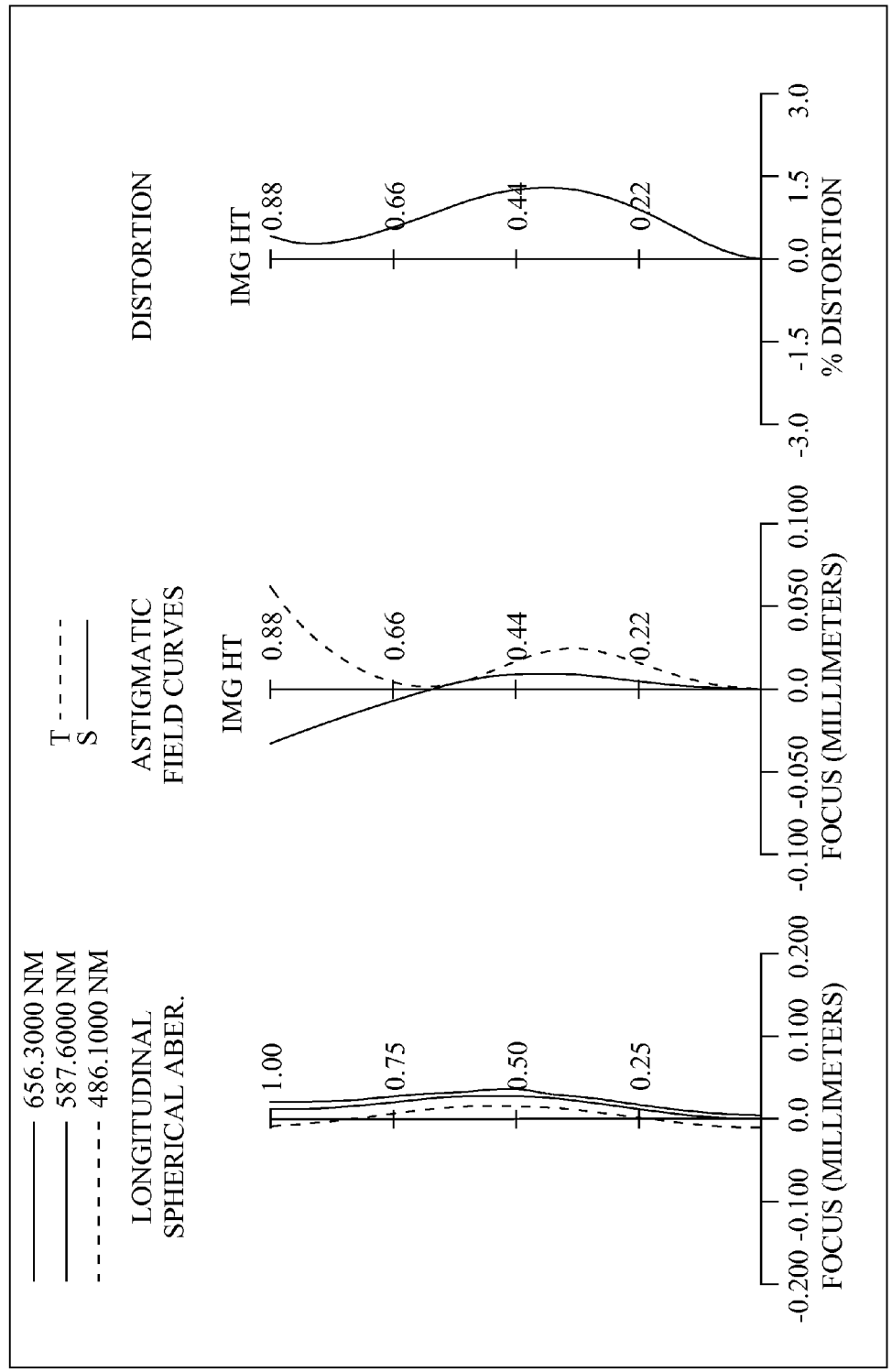
FIG. 3B is an aberration curve of the third preferred embodiment of the present invention.

With reference to FIGS. 3A and 3B for a schematic view and an aberration curve of a thin optical lens assembly in accordance with a third preferred embodiment of the present invention respectively, the thin optical lens assembly of this preferred embodiment sequentially arranged from an object side to an image side, comprises: a first lens element (310) with a positive refractive power having a convex object-side surface (311) and a convex image-side surface (312), wherein it is made of plastic with both of its surfaces being aspheric; and a second lens element (320) with a negative refractive power having a concave object-side surface (321) and a convex image-side surface (322) wherein it is made of plastic with both of its surfaces being aspheric and the image-side surface (322) of the second lens element (320) includes an inflection point. The surfaces of the first lens element (310) and the second lens element (120) are formed according to the aspherical surface formula as shown in Equation (14), and the aspherical surface coefficient is shown in FIG. 12 (as Table 6).

In addition, the thin optical lens assembly further comprises an aperture stop (300) formed between the first lens element (310) and the imaged object, an image sensor (370) on an image plane (260), and an IR-filter (350) installed between the second lens element (320) and image plane (360). The IR-filter (350) is made of glass and does not affect the focal length of the thin optical lens assembly of the present invention. Optical data of this preferred embodiment is shown in FIG. 11 (as Table 5) and is the basis of the calculated values for the conditional equations of this preferred embodiment in the following paragraphs.

In this preferred embodiment of the thin optical lens assembly, the thin optical lens assembly has a focal length f, an f-number value Fno, and a half of the maximum view angle HFOV, and the following conditions are satisfied:

$f=1.42$(mm)

Fno=2.85

$HFOV=31.6$(degrees).

In this preferred embodiment of the thin optical lens assembly, the definitions of all variables for conditions provided in the claims ($N_2$, $v_1$, $v_2$, $T_{12}$, $CT_2$, $R_1$, $R_2$, $R_3$, $R_4$, $f_1$, $f_2$, $SAG_{22}$, $Y_{22}$, SL, TTL, and ImgH) are the same as those stated in the first embodiment with corresponding values for the second embodiment, and the following conditions are satisfied:

| | |
|---|---|
| $N_2 = 1.634$; | $(R_3 + R_4)/(R_3 - R_4) = -2.66$; |
| $v_2 = 23.8$; | $f/f_2 = -1.27$; |
| $v_1 - v_2 = 32.1$; | $(f/f_1) + (f/f_2) = 0.79$; |
| $T_{12}/CT_2 = 0.98$; | $SAG_{22}/Y_{22} = 0.16$; |
| $R_1/R_2 = -6.17$; | $SL/TTL = 1.06$; |
| $R_2/R_3 = 1.72$; | $TTL/ImgH = 2.31$. |

According to the optical data as shown in FIG. 11 (as Table 5) and the aberration curve as shown in FIG. 3B, the thin optical lens assembly of this preferred embodiment of the present invention provides good correction results in aspects of the longitudinal spherical aberration, astigmatic field curving, and distortion while achieving the total length reduction of the thin optical lens assembly.

<Fourth Preferred Embodiment>

Figure 4A:
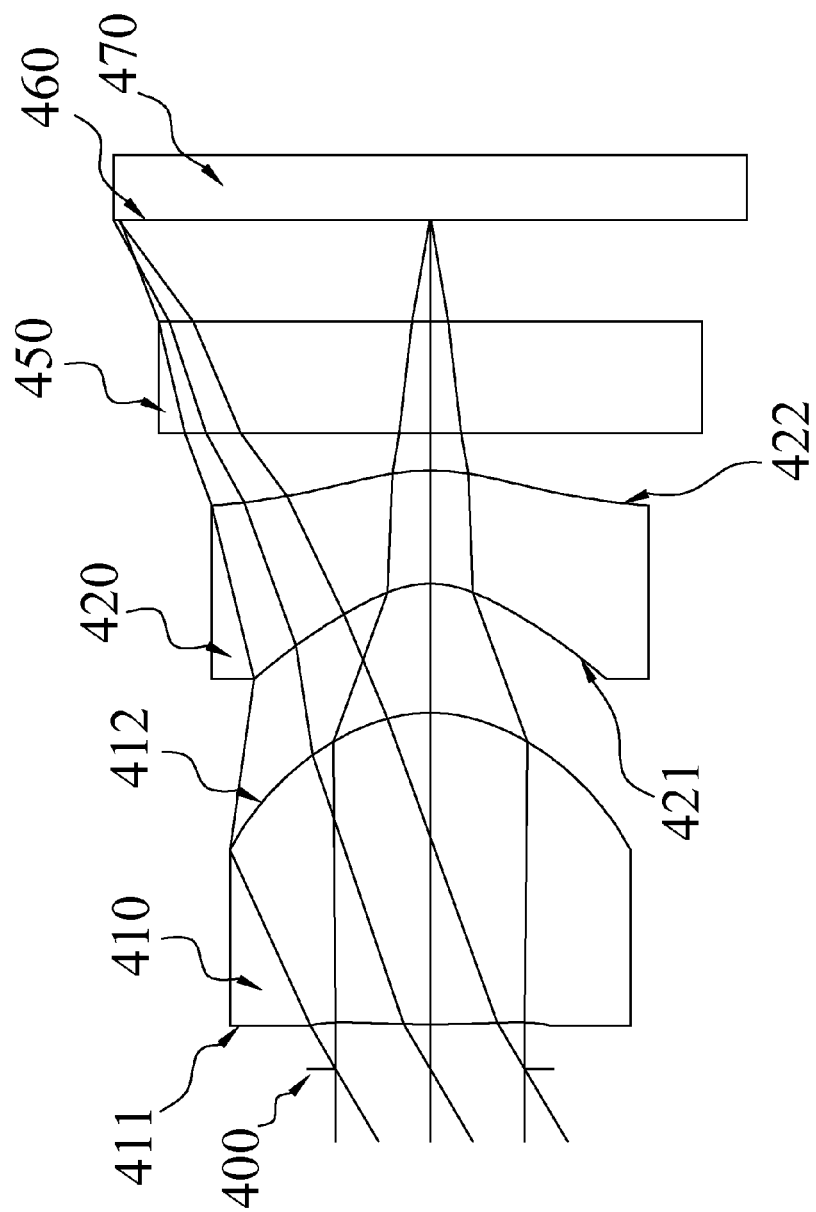
FIG. 4A is a schematic view of a lens assembly in accordance with the fourth preferred embodiment of the present invention.
Figure 4B:
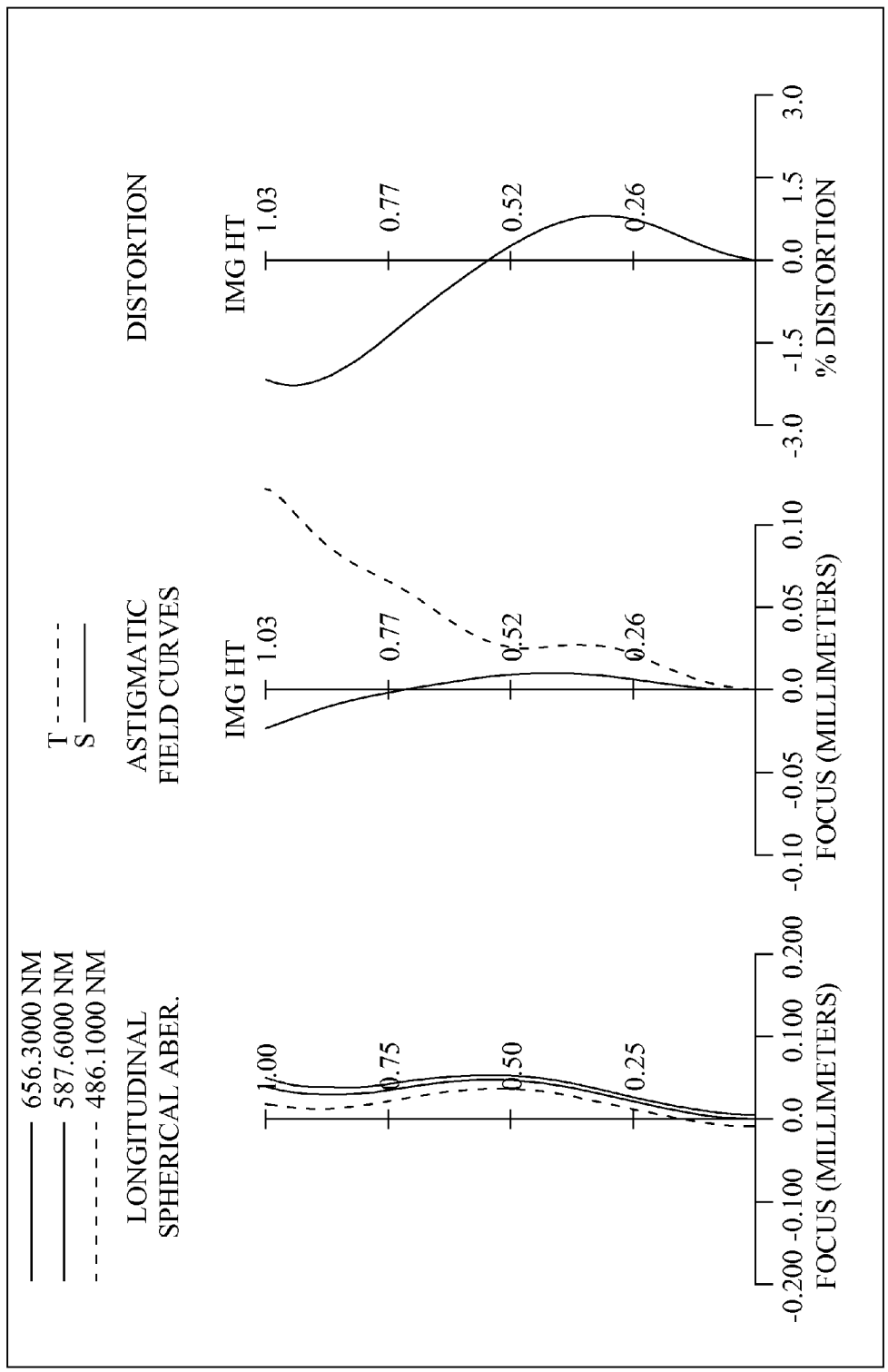
FIG. 4B is an aberration curve of the fourth preferred embodiment of the present invention.

With reference to FIGS. 4A and 4B for a schematic view and an aberration curve of a thin optical lens assembly in accordance with a fourth preferred embodiment of the present invention respectively, the thin optical lens assembly of this preferred embodiment comprises, from an object side to an image side, a first lens element (410) with a positive refractive power having a convex object-side surface (411) and a convex image-side surface (412) wherein it is made of plastic with both of its surfaces being aspheric; and a second lens element (420) with a negative refractive power having a concave object-side surface (421) and a convex image-side surface (422) wherein it is made of plastic with both of its surfaces being aspheric and the image-side surface (422) of the second lens element (420) includes at least one inflection point. The surfaces of the first lens element (410) and the second lens element (420) are formed according to the aspherical surface formula as shown in Equation (14), and the aspherical surface coefficient is shown in FIG. 14 (as Table 8).

In addition, the thin optical lens assembly further comprises an aperture stop (400) formed between the first lens element (410) and the imaged object, an image sensor (470) installed at a position on an image plane (460). The IR-filter (450) is made of glass and does not affect the focal length of the thin optical lens assembly of the present invention. Optical data of this preferred embodiment is shown in FIG. 13 (as Table 7) and is the basis of the calculated values for the conditional equations of this preferred embodiment.

In this preferred embodiment of the thin optical lens assembly, the thin optical lens assembly has a focal length f, an f-number value Fno, a half of the maximum view angle HFOV, and the following conditions are satisfied:

$f=1.47$(mm)

Fno=2.85

$HFOV=35.4$(degrees).

In this preferred embodiment of the thin optical lens assembly, the definitions of all variables for conditions provided in the claims ($N_2$, $v_1$, $v_2$, $T_{12}$, $CT_2$, $R_1$, $R_2$, $R_3$, $R_4$, $f_1$, $f_2$, $SAG_{22}$, $Y_{22}$, SL, TTL, and ImgH) are the same as those stated in the first embodiment with corresponding values for the second embodiment, and the following conditions are satisfied:

| | |
|---|---|
| $N_2 = 1.650$; | $(R_3 + R_4)/(R_3 - R_4) = -2.57$; |
| $v_2 = 21.4$; | $f/f_2 = -1.31$; |
| $v_1 - v_2 = 35.1$; | $(f/f_1) + (f/f_2) = 0.67$; |
| $T_{12}/CT_2 = 1.14$; | $SAG_{22}/Y_{22} = 0.14$; |
| $R_1/R_2 = -6.50$; | $SL/TTL = 1.06$; |
| $R_2/R_3 = 1.62$; | $TTL/ImgH = 2.01$. |

According to the optical data as shown in FIG. 13 (as Table 7) and the aberration curve as shown in FIG. 4B, the thin optical lens assembly of this preferred embodiment of the present invention provides good correction results in aspects of the longitudinal spherical aberration, astigmatic field curving, and distortion while achieving the total length reduction of the thin optical lens assembly.

<Fifth Preferred Embodiment>

Figure 5A:
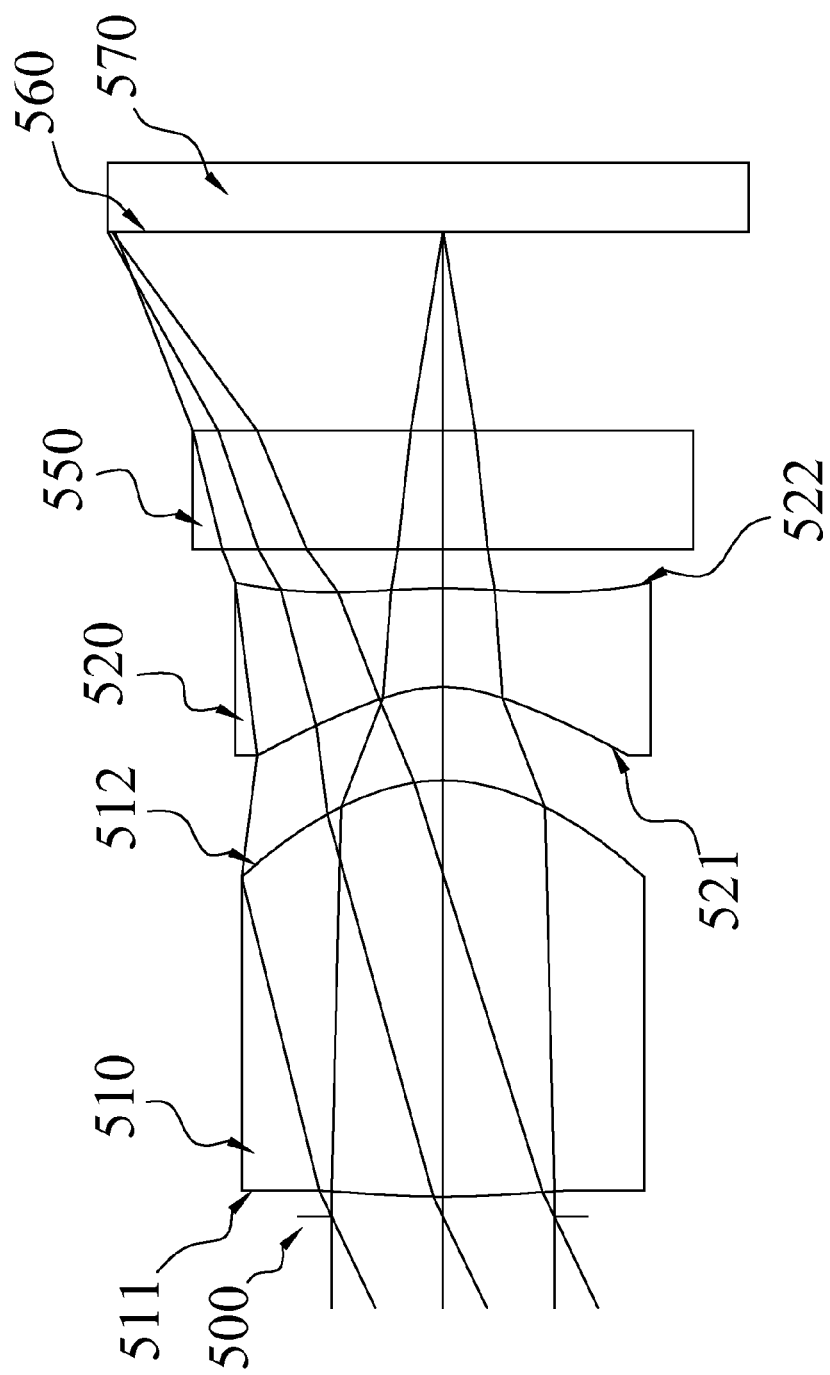
FIG. 5A is a schematic view of a lens assembly in accordance with the fifth preferred embodiment of the present invention.
Figure 5B:
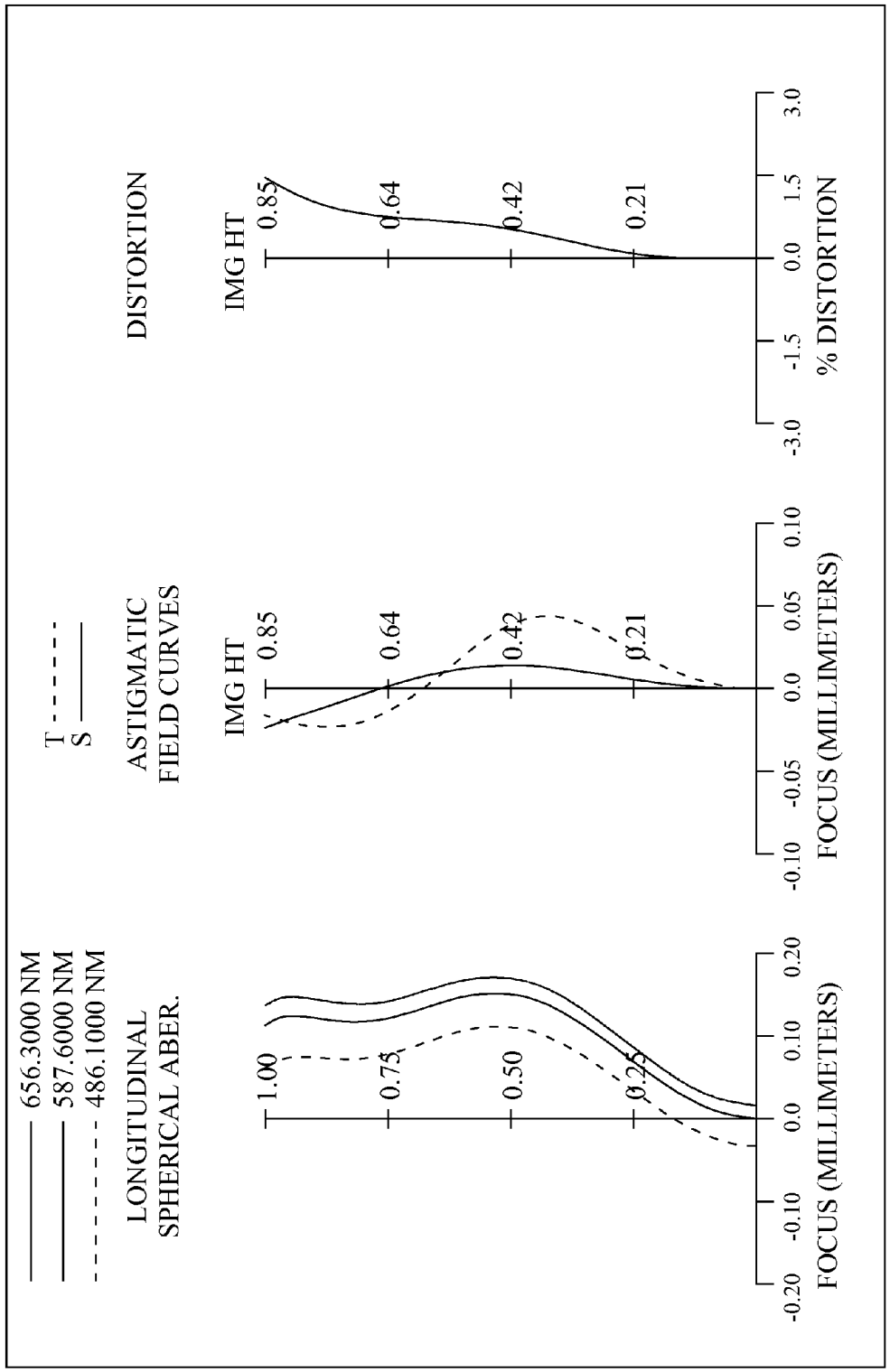
FIG. 5B is an aberration curve of the fifth preferred embodiment of the present invention.

With reference to FIGS. 5A and 5B for a schematic view and an aberration curve of a thin optical lens assembly in accordance with a fifth preferred embodiment of the present invention respectively, the thin optical lens assembly of this preferred embodiment comprises, a first lens element (510) with a positive refractive power having a convex object-side surface (511) and a convex image-side surface (512), wherein it is made of plastic with both of its surfaces being aspheric; and a second lens element (520) with a negative refractive power having a concave object-side surface (521) and a convex image-side surface (522) wherein it is made of plastic with both of its surfaces being aspheric and the image-side surface (522) of the second lens element (520) includes at least one inflection point. The surfaces of the first lens element (510) and the second lens element (520) are formed according to the aspherical surface formula and the as shown in Equation (14), and the aspherical surface coefficient is shown in FIG. 16 (as Table 10).

In addition, the thin optical lens assembly further comprises an aperture stop (500) formed between the first lens element (510) and the imaged object, an image sensor (570) installed at a position on an image plane (560). The IR-filter (550) is made of glass and does not affect the focal length of the thin optical lens assembly of the present invention. Optical data of this preferred embodiment is shown in FIG. 15 (as Table 9) and is the basis of the calculated values for the conditional equations of this preferred embodiment.

In this preferred embodiment of the thin optical lens assembly, the thin optical lens assembly has a focal length f, an f-number value Fno, a half of the maximum view angle HFOV, and the following conditions are satisfied:

$f=1.74$(mm)

Fno=2.88

$HFOV=25.5$(degrees).

In this preferred embodiment of the thin optical lens assembly, the definitions of all variables for conditions provided in the claims ($N_2$, $v_1$, $v_2$, $T_{12}$, $CT_2$, $R_1$, $R_2$, $R_3$, $R_4$, $f_1$, $f_2$, $SAG_{22}$, $Y_{22}$, SL, TTL, and ImgH) are the same as those stated in the first embodiment with corresponding values for the second embodiment, and the following conditions are satisfied:

| | |
|---|---|
| $N_2 = 1.650$; | $(R_3 + R_4)/(R_3 - R_4) = -1.58$; |
| $v_2 = 21.4$; | $f/f_2 = -2.23$; |
| $v_1 - v_2 = 8.8$; | $(f/f_1) + (f/f_2) = 0.09$; |
| $T_{12}/CT_2 = 0.95$; | $SAG_{22}/Y_{22} = 0.03$; |
| $R_1/R_2 = -4.42$; | $SL/TTL = 1.02$; |
| $R_2/R_3 = 1.25$; | $TTL/ImgH = 2.76$. |

According to the optical data as shown in FIG. 16 (as Table 10) and the aberration curve as shown in FIG. 5B, the thin optical lens assembly of this preferred embodiment of the present invention provides good correction results in aspects of the longitudinal spherical aberration, astigmatic field curving, and distortion while achieving the total length reduction of the thin optical lens assembly.

<Sixth Preferred Embodiment>

Figure 6A:
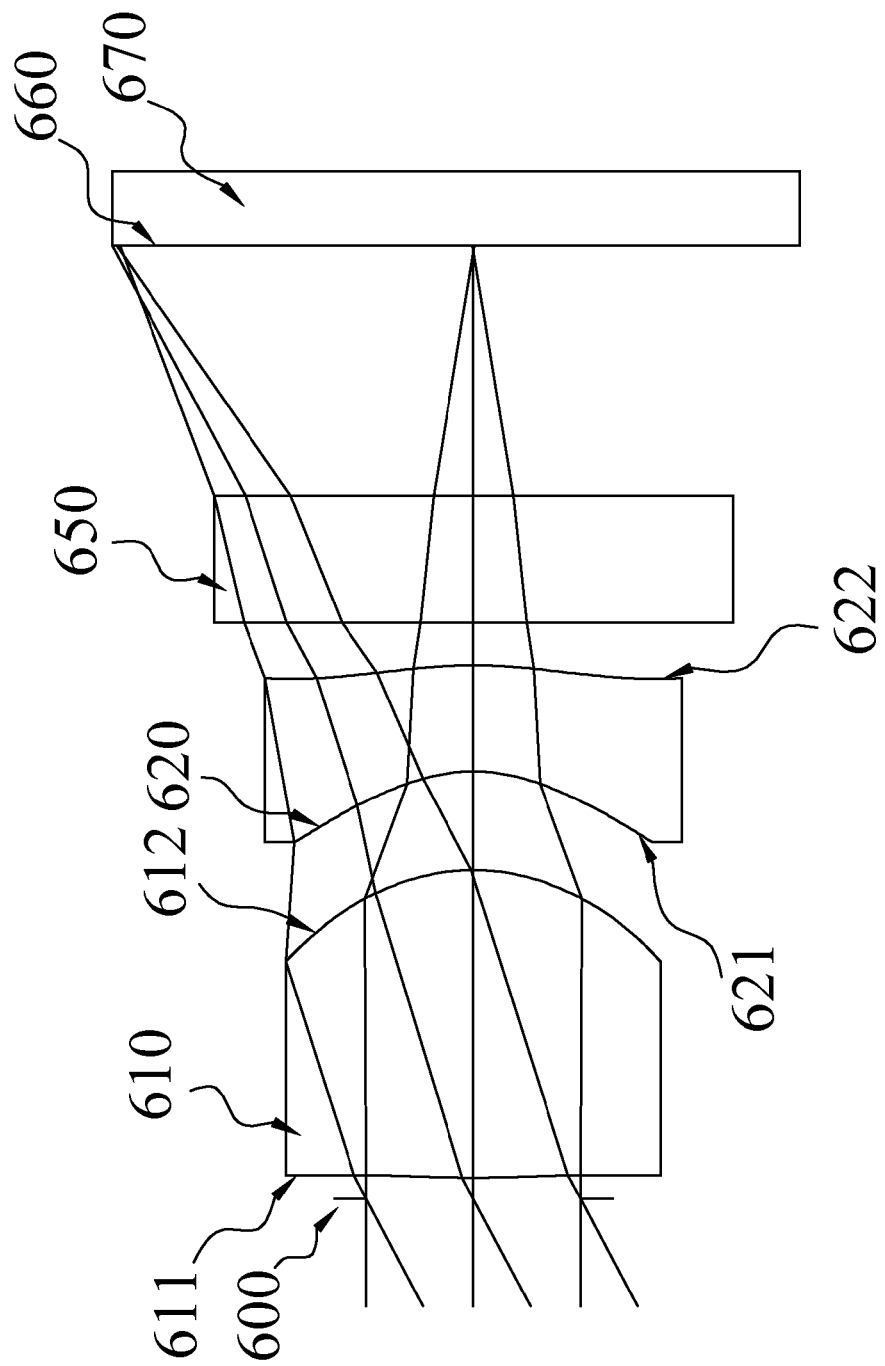
FIG. 6A is a schematic view of a lens assembly in accordance with the sixth preferred embodiment of the present invention.
Figure 6B:
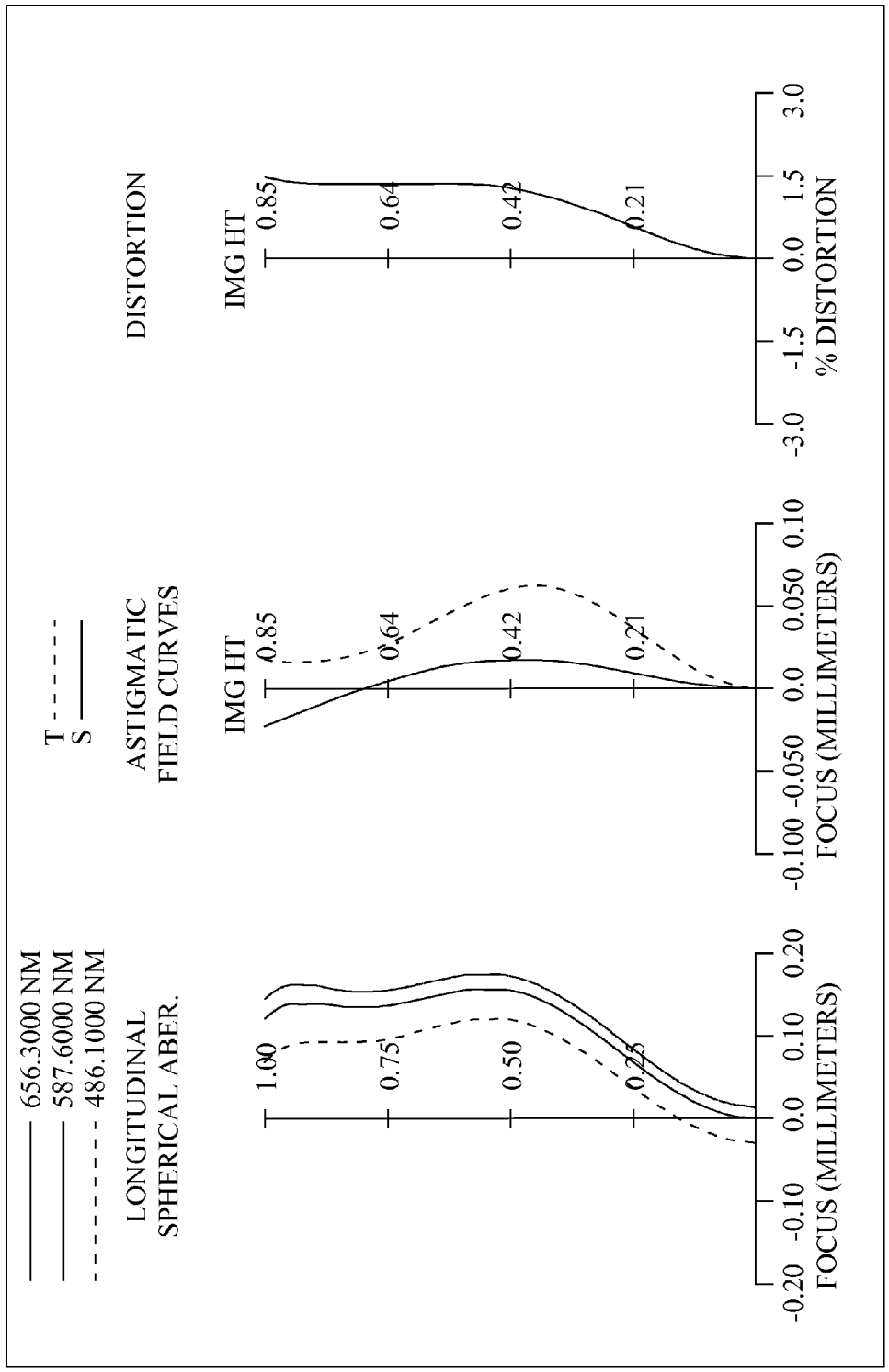
FIG. 6B is an aberration curve of the sixth preferred embodiment of the present invention.

With reference to FIGS. 6A and 6B for a schematic view and an aberration curve of a thin optical lens assembly in accordance with a sixth preferred embodiment of the present invention respectively, the thin optical lens assembly of this preferred embodiment comprises, from an object side to an image side, a first lens element (610) with a positive refractive power having a convex object-side surface (611) and a convex image-side surface (612) wherein it is made of plastic with both of its surfaces being aspheric; and a second lens element (620) with a negative refractive power having a concave object-side surface (621) and a convex image-side surface (622) wherein it is made of plastic with both of its surfaces being aspheric and the image-side surface (622) includes at least one inflection point. The surfaces of the first lens element (610) and the second lens element (520) are formed according to the aspherical surface formula as shown in Equation (14), and the aspherical surface coefficient is shown in FIG. 18 (as Table 12).

In addition, the thin optical lens assembly further comprises an aperture stop (600) formed between the first lens element (610) and the imaged object, an image sensor (670) on an image plane (660), an IR-filter (650) installed between the second lens element (620) and image plane (660). The IR-filter (650) is made of glass and does not affect the focal length of the thin optical lens assembly of the present invention. Optical data of this preferred embodiment is shown in FIG. 17 (as Table 11) and is the basis of the calculated values for the conditional equations of this preferred embodiment.

In this preferred embodiment of the thin optical lens assembly, the thin optical lens assembly has a focal length f, an f-number value Fno, a half of the maximum view angle HFOV, and the following conditions are satisfied:

$$f=1.57(mm)$$

$$Fno=2.88$$

$$HFOV=27.8(degrees).$$

In this preferred embodiment of the thin optical lens assembly, the definitions of all variables for conditions provided in the claims ($N_2$, $v_1$, $v_2$, $T_{12}$, $CT_2$, $R_1$, $R_2$, $R_3$, $R_4$, $f_1$, $f_2$, $SAG_{22}$, $Y_{22}$, SL, TTL, and ImgH) are the same as those stated in the first embodiment with corresponding values for the second embodiment, and the following conditions are satisfied:

| | |
|---|---|
| $N_2 = 1.650$; | $(R_3 + R_4)/(R_3 - R_4) = -2.12$; |
| $v_2 = 21.4$; | $f/f_2 = -1.45$; |
| $v_1 - v_2 = 8.8$; | $(f/f_1) + (f/f_2) = 0.67$; |
| $T_{12}/CT_2 = 0.93$; | $SAG_{22}/Y_{22} = 0.06$; |
| $R_1/R_2 = -5.07$; | $SL/TTL = 1.02$; |
| $R_2/R_3 = 1.22$; | $TTL/ImgH = 2.46$. |

According to the optical data as shown in FIG. 17 (as Table 11) and the aberration curve as shown in FIG. 5B, the thin optical lens assembly of this preferred embodiment of the present invention provides good correction results in aspects of the longitudinal spherical aberration, astigmatic field curving, and distortion while achieving the total length reduction of the thin optical lens assembly.

In the thin optical lens assembly of the present invention, the lens can be made of glass or plastic. If the lens is made of glass, the selection of the refractive power for the thin optical lens assembly can be more flexible. If the lens is made of plastic, the production cost can be reduced effectively. In addition, an aspherical surface is formed on an optical surface of the lens, and the aspherical surface can be easily manufactured into shapes other than those within the limitation of a spherical surface to have more control factors for eliminating aberrations, so as to reduce the number of lenses used and the total length of the thin optical lens assembly of the present invention.

In the thin optical lens assembly of the present invention, if the lens surface is convex, the lens surface in proximity to the axis is convex; and if the lens surface is concave, the lens surface in proximity to the axis is concave.

In the thin optical lens assembly of the present invention, at least one stop (not shown in the figure) is provided for reducing stray lights to improve the image quality.

Tables 1 to 12(corresponding to FIGS. 7 to 18) show changes of values of a thin optical lens assembly in accordance with preferred embodiments of the present invention respectively. However, the changes of values in the preferred embodiments of the present invention are obtained from experiments. Even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

While the invention has been described by means of specific embodiments, numerous modifications and variations could be made thereto by those generally skilled in the art without departing from the scope and spirit of the invention set forth in the claims.

What is claimed is:

1. A thin optical lens assembly, comprising two lens elements with refractive power arranged sequentially from an object side to an image side along an optical axis:
    a first lens element with a positive refractive power having an object-side surface and an image-side surface thereof both being convex and aspheric; and
    a second lens element with a negative refractive power having a concave object-side surface and a convex image-side surface thereof both being aspheric, wherein the second lens element comprises at least one inflection point;
    wherein the thin optical lens assembly has a total of two lens elements with refractive power, and the first lens element and the second lens element are made of plastic materials;
    wherein the thin optical lens assembly further comprises an aperture stop;
    wherein, the second lens element has an Abbe number $v_2$ and a refractive index $N_2$, the thin optical lens assembly has a focal length f, the first lens element has a focal length $f_1$, the second lens element has a focal length $f_2$, the first lens element has a radius of curvature $R_1$ on the object-side surface, the first lens element has a radius of curvature $R_2$ on the image-side surface, the second lens element has a radius of curvature $R_3$ on the object-side surface, a distance from the aperture stop to the image plane on the optical axis is SL, a distance from the object-side surface of the first lens element to the image plane on the optical axis is TTL, a vertical distance between a maximum-range position where the light passes through the image-side surface of the second lens element to the optical axis is $Y_{22}$, distance between a position $Y_{22}$ from the optical axis on the ima e-side surface of the second lens element and a tangential plane through a vertex on the optical axis of the image-side surface of the second lens element is $SAG_{22}$, and the following conditions are satisfied:

$$v_2<25;$$

$$N_2<1.75;$$

$$-2.0<f/f_2-1.27;$$

$$0.0<(f/f_1)+(f/f_2)<1.2;$$

$$-7.0<R_1/R_2<-3.5;$$

$$1.2<R_2/R_3<2.5;$$

$$0.9<SL/TTL<1.2; \text{ and}$$

$$0.1<SAG_{22}/Y_{22}<0.2.$$

2. The thin optical lens assembly of claim 1, wherein the first lens element has an Abbe number $v_1$, the second lens element has an Abbe number $v_2$, and the condition of $31<v_1-v_2<42$ is satisfied.

3. The thin optical lens assembly of claim 1, wherein the object-side surface of the second lens element has a radius of curvature $R_3$, the image-side surface of the second lens element has a radius of curvature $R_4$, and the condition of $-3.5<(R_3+R_4)/(R_3-R_4)<-2.0$ is satisfied.

4. The thin optical lens assembly of claim 1, wherein a distance from the image-side surface of the first lens element to the object-side surface of the second lens element on the optical axis is $T_{12}$, a thickness of the second lens element is $CT_2$, and the condition of $0.50<T_{12}/CT_2<1.25$ is satisfied.

5. The thin optical lens assembly of claim 1, wherein the thin optical lens assembly has a focal length f, the first lens element has a focal length $f_1$, the second lens element has a focal length $f_2$, and the condition of $0.5<(f/f_1)+(f/f_2)<0.9$ is satisfied.

6. The thin optical lens assembly of claim 1, wherein the radius of curvature of the image-side surface of the first lens element is $R_2$, the radius of curvature of the object-side surface of the second lens element is R3, and the condition of $1.5<R_2/R_3<1.9$ is satisfied.

7. The thin optical lens assembly of claim 1, the thin optical lens assembly further comprises an image sensor on the image plane, a distance from the object-side surface of the first lens element to the image plane on the optical axis is TTL, half of the diagonal length of an effective photosensitive area of the image sensor is ImgH, and the condition of TTL/ImgH<2.5 is satisfied.

\* \* \* \* \*

UNITED STATES PATENT AND TRADEMARK OFFICE
CERTIFICATE OF CORRECTION

PATENT NO. : 8,654,454 B2  
APPLICATION NO. : 13/150634  
DATED : February 18, 2014  
INVENTOR(S) : Hsiang-Chi Tang, Chun-Shan Chen and Hsin-Hsuan Huang Page 1 of 1

It is certified that error appears in the above-identified patent and that said Letters Patent is hereby corrected as shown below:

In the Claims

In claim 1, col. 14, line 41, "ima e-side" should be "image-side".

In claim 1, col. 14, line 50, "-2.0 < f/f$_2$ -1.27" should be "-2.0 < f/f$_2$≤ -1.27".

Signed and Sealed this  
Sixth Day of May, 2014

Michelle K. Lee  
*Deputy Director of the United States Patent and Trademark Office*